United States Patent
Brown, Jr. et al.

(10) Patent No.: US 10,538,127 B2
(45) Date of Patent: *Jan. 21, 2020

(54) TRACTION JACK

(71) Applicant: Traction Jack, Albuquerque, NM (US)

(72) Inventors: Jeffrey Brown, Jr., El Paso, TX (US); Carlos Amaro, El Paso, TX (US)

(73) Assignee: Traction Jack, LLC, El Paso, TX (US)

( * ) Notice: Subject to any disclaimer, the term of this patent is extended or adjusted under 35 U.S.C. 154(b) by 263 days.

This patent is subject to a terminal disclaimer.

(21) Appl. No.: 15/050,667

(22) Filed: Feb. 23, 2016

(65) Prior Publication Data

US 2016/0272004 A1    Sep. 22, 2016

Related U.S. Application Data

(63) Continuation of application No. 13/914,775, filed on Jun. 11, 2013, now Pat. No. 9,434,210, which is a continuation-in-part of application No. 13/362,652, filed on Jan. 31, 2012, now Pat. No. 8,684,278, and a continuation-in-part of application No. 13/031,913, filed on Feb. 22, 2011, now Pat. No. 8,925,830.

(60) Provisional application No. 61/534,674, filed on Oct. 6, 2011, provisional application No. 61/438,322, filed on Feb. 1, 2011, provisional application No. 61/306,604, filed on Feb. 22, 2010.

(51) Int. Cl.
*B60B 39/12* (2006.01)
*B66F 5/02* (2006.01)

(52) U.S. Cl.
CPC .............. *B60B 39/12* (2013.01); *B66F 5/025* (2013.01); *B60B 2900/721* (2013.01); *B60Y 2200/11* (2013.01); *B60Y 2200/12* (2013.01); *B60Y 2200/14* (2013.01); *B60Y 2200/20* (2013.01)

(58) Field of Classification Search
CPC ......... B60B 39/00; B60B 39/04; B60B 39/06; B60B 39/12; E01B 23/00; E01B 23/10
See application file for complete search history.

(56) References Cited

U.S. PATENT DOCUMENTS

| | | | |
|---|---|---|---|
| 2,227,750 A | 1/1941 | Hinson | |
| 2,420,130 A | 5/1947 | Foss | |
| 2,479,760 A * | 8/1949 | Merrick | B60B 39/12 238/14 |
| 3,708,117 A | 1/1973 | Coale | |
| 3,858,803 A | 1/1975 | Gantert | |
| 4,300,722 A | 11/1981 | Simmons | |
| 5,402,941 A * | 4/1995 | MacLeod | B60B 39/12 238/14 |

(Continued)

*Primary Examiner* — Robert J McCarry, Jr.
(74) *Attorney, Agent, or Firm* — Luis M. Ortiz; Kermit D. Lopez

(57) ABSTRACT

A vehicle traction jack that functions as a traction mat platform, ramp, and vehicle jack to assist a vehicle's tire when a tire is stuck in a rut, hole, or some sort of terrain or weather condition such as sand, gravel, dirt, mud, or snow is disclosed. The traction jack comprises a first plate and second plate, a hinge assembly, and a removable center jack mechanism. The first and second plates can extend to a partially-opened or fully-opened position forming a ramp and traction mat platform. The removable center jack mechanism attaches to first plate and second plate via pins. Easily stored in a vehicle at all times, a single user can use the traction jack to help move any type of vehicle's tire.

2 Claims, 8 Drawing Sheets

(56) References Cited

U.S. PATENT DOCUMENTS

| | | | |
|---|---|---|---|
| 5,439,171 A * | 8/1995 | Fruend | B60B 39/12 152/208 |
| 5,538,183 A * | 7/1996 | McGee | B60B 39/12 238/14 |
| 5,855,359 A | 1/1999 | Chipperfield | |
| 6,314,602 B1 | 11/2001 | Wallen | |
| 6,779,738 B1 | 8/2004 | Stannard | |
| 7,003,836 B2 | 2/2006 | Berg | |
| 7,526,826 B2 | 5/2009 | Bailie | |
| 8,684,278 B2 | 4/2014 | Brown, Jr. et al. | |
| 9,434,210 B2 * | 9/2016 | Brown, Jr. | B66F 5/025 |
| 2007/0234491 A1 | 10/2007 | Bailie | |
| 2009/0300859 A1 | 12/2009 | Lucht | |

* cited by examiner

TRACTION JACK

CROSS REFERENCE TO RELATED APPLICATIONS

This patent application is a Continuation of U.S. application Ser. No. 13/914,775, filed on Jun. 11, 2013, entitled "Traction Jack," which is a Continuation-in-Part of U.S. Non-Provisional patent application Ser. No. 13/362,652, filed on Jan. 31, 2012, which claims the benefit and priority of under 35 U.S.C. § 119(e) of U.S. Provisional Patent Application Ser. No. 61/438,322 filed on Feb. 1, 2011, and entitled "Traction Jack," and which is incorporated herein by reference in its entirety, and also claims the benefit and priority of under 35 U.S.C. § 119(e) of U.S. Provisional Patent Application Ser. No. 61/534,674 filed on Oct. 6, 2011, and entitled "Traction Jack," which is incorporated herein by reference in its entirety. U.S. application Ser. No. 13/914,775 is also a Continuation-in-Part of U.S. Non-Provisional patent application Ser. No. 13/031,913 filed on Feb. 22, 2011, and entitled "Traction Jack," and which is incorporated herein by reference in its entirety, which claims the benefit and priority under 35 U.S.C. § 119(e) of U.S. Provisional Patent Application Ser. No. 61/306,604, filed on Feb. 22, 2010, and U.S. Provisional Patent Application Ser. No. 61/438,322, filed on Feb. 1, 2011, both entitled "Traction Jack," and which are incorporated herein by reference in their entirety.

FIELD OF THE INVENTION

The disclosed embodiments relate to traction devices. The disclosed embodiments further relate to techniques for providing additional traction for a vehicle's tires for removal from loose terrain or adverse weather conditions. The disclosed embodiments also relate to a vehicle ramp and jack for raising a vehicle for repair.

BACKGROUND

Various devices have been developed for improving traction between a vehicle's tires and a road surface made slippery by adverse weather or inferior roadbed conditions such as ice, snow, mud, and desert sand. Proposed traction devices help a vehicle drive out of a rut or pothole by gaining additional traction from materials placed into the path of the tires. Such traction aids include boards, burlap bags, pieces of carpeting, tire chains, and various bulky ramps, for example. These makeshift means are generally ineffective when caught and thrown out by the rotating tires. Typically, a standard block of wood is used with the assistance of numerous people to free off-roaders in desert terrain, which often leads to damaged tires and vehicles.

Other traction devices are prohibitively expensive to purchase and unsafe to handle because of sharp edges and heavy components. Prior traction mats are often difficult to position beneath the vehicle's tires for use. When a vehicle's tires become mired in snow, mud, or desert sand for some depth, the resulting ruts formed by the vehicle's tires are often deep and steeply sloping. Flexible traction mats tend to closely conform to steeply sloping walls of a rut or may sink in various road conditions, making it difficult for a vehicle to climb out under its own power. When a prior traction mat is used to extricate a vehicle from such an environment, the tire frequently engages and slides against the leading or front edge of the mat without gaining a satisfactory grip.

A motorist may want access to a variety of vehicle tools without having to store numerous devices in the vehicle. While traction mats and other aids such as jacks and repair ramps can be carried in a vehicle, they fight for storage space with other items. Manual and automated vehicle jacks are usually carried in a vehicle and used principally to assist a motorist with changing a vehicle's tire. A manual jack that attaches to the bumper or frame of vehicle at designated points is a widely used method of jacking or lifting a vehicle. After placement, a manual jack is usually cranked to lift the vehicle and repair a desired tire. An all-in-one traction jack device needs to save the motorist time and effort by helping the tires to regain traction for return to the roadway and to eliminate the high cost of an emergency road service truck for winching the stranded vehicle from a slippery hole or rut.

Accordingly, there exists a need for an effective, space-saving vehicle traction jack device that provides additional traction and a ramped surface to lend traction to move a vehicle's tires when the tires are stuck in terrain and/or weather conditions.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is therefore an object of the disclosed embodiments to provide a space-saving vehicle traction and jack device.

It is another object of the disclosed embodiments to provide a ramped-surface to assist a vehicle's tires when the tires are stuck in loose terrain or adverse weather conditions.

It is an additional object of the disclosed embodiments to provide an all-in-one vehicle traction surface, ramp, and jack for raising a vehicle for repair.

The above and other aspects can be achieved as is now described. A vehicle traction jack that functions as a traction mat platform, ramp, and vehicle jack to assist a vehicle's tire when a tire is stuck in a rut, hole, or some sort of terrain or weather condition, such as sand, gravel, dirt, mud, or snow is disclosed. The traction jack comprises a first plate and second plate, a hinge assembly, and a removable center jack mechanism. The first and second plates can extend to a partially-opened or fully-opened position, forming a ramp and traction mat platform. The removable center jack mechanism attaches to first plate and second plate via pins. Easily stored in a vehicle at all times, a single user can use the traction jack to help move any type of vehicle's tire.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
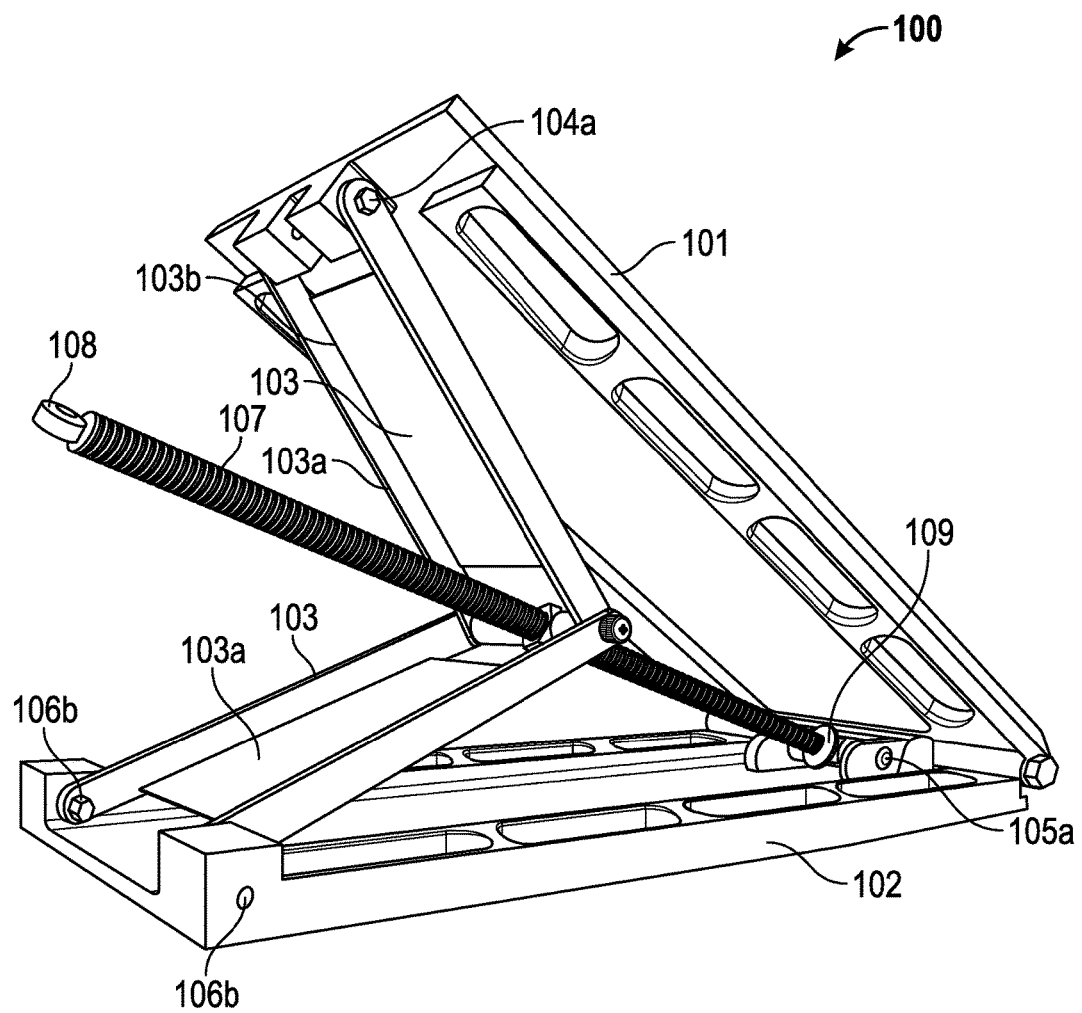
FIG. 1 illustrates an exemplary perspective view of the traction jack in a partially opened position, in accordance with a preferred embodiment.

FIG. 1 illustrates an exemplary perspective view 100 of the traction jack in a partially opened position, in accordance with a preferred embodiment. The traction jack functions as a combination traction mat platform, ramp, driveway jack stand, wheel blocks/tire chocks for winching or parking, and vehicle jack to assist a vehicle's tire when a vehicle high-centered, to support a vehicle when the undercarriage of the vehicle becomes bottomed out, or a tire is stuck in a rut, hole, a roadway surface, or some sort of terrain or weather condition such as sand, gravel, dirt, mud, or snow, for example. The vehicle traction jack can adjust and reconfigure to perform different tasks such as assisting in vehicle repair on the underside of the vehicle and rescuing vehicle from loose material on roadways and unpaved surfaces. The vehicle traction jack can free any type of vehicle including such as, for example, cars, trucks, sport utility vehicles ("SUVs"), all-terrain vehicle ("ATVs"), motorcycles, etc. Military vehicles require assistance to escape loose sand and dirt. Easily stored in a vehicle at all times, the lightweight vehicle traction jack can be used by only one person. Any number of disclosed vehicle traction jacks can be used at one time to dislodge a vehicle by placing the vehicle traction jack either in front of or behind a vehicle's tire.

Figure 3:
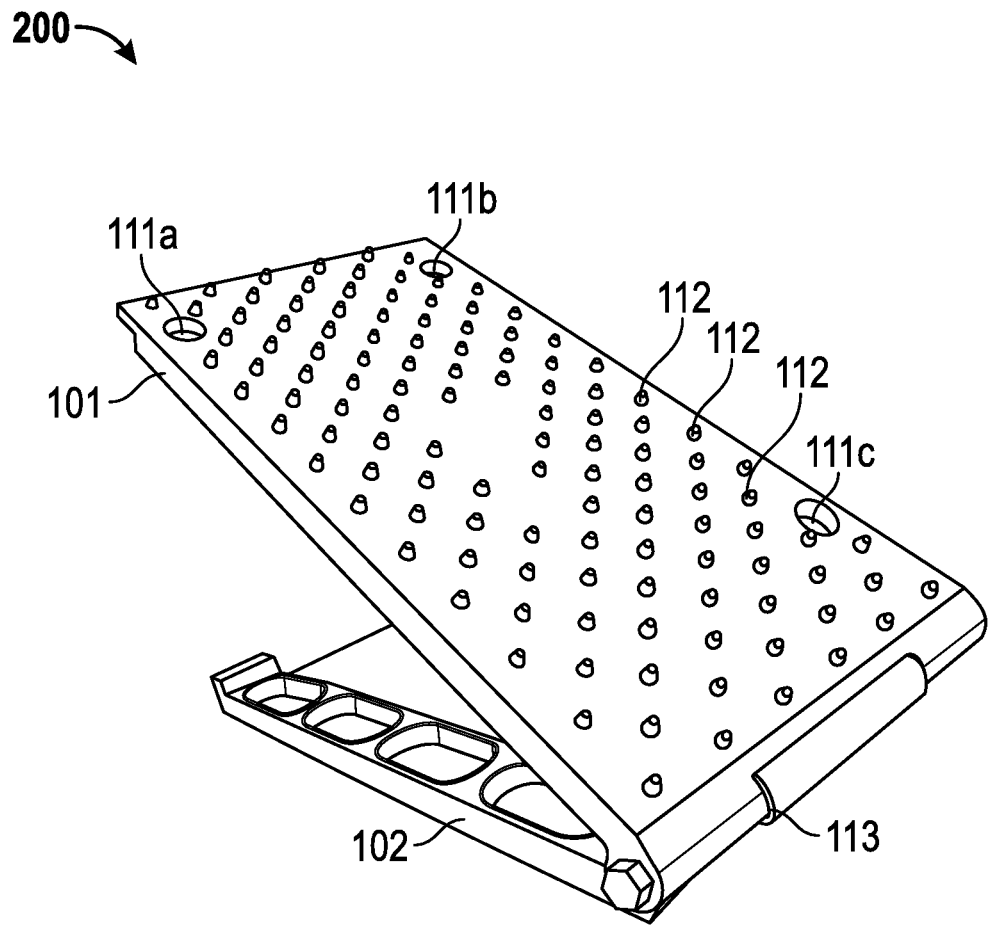
FIG. 3 illustrates an exemplary perspective view of the traction jack in a partially opened position, in accordance with an embodiment.

The traction jack comprises a first plate 101, a second plate 102, a hinge assembly 113, and removable center jack mechanism 103. The first plate 101 is a rigid and rectangular surface capable of withstanding the weight of a vehicle. Heat-treated, high strength aluminum or steel are preferably used in the first plate's 101 casting process. The first plate 101 is covered in a spiked, anti-slip, high traction surface (as illustrated in FIG. 3) such as, for example, spikes 112 recycled tire tread, corrugated metal, or any type of adhered abrasive material to lend additional traction, but is not limited to those items. The spiked, high-traction surface can completely cover the first plate 101 or can be arranged in strips or cover portions of the first plate 101, for example.

The second plate 102 is a rigid, rectangular surface of the same size and material construction of the first plate 101. Heat-treated, high strength aluminum or steel are preferably used in the second plate's 102 casting process. The second plate 102 is also covered in a spiked, anti-slip, high traction surface. The spikes 112 can completely cover the second plate 102 or can be arranged in strips or cover portions of the second plate 102, for example. The high traction surface possesses high coefficients of static friction for frictional engagement with a vehicle's tire.

Removable center jack mechanism 103 preferably comprises two lifting plates 103a, 103b of high quality steel that supports up to 3000 pounds, for example, on first plate 101. Lifting plate 103a attaches at one end to first plate 101 and at the opposite end to shaft 107 forming a hinge. Lifting plate 103b attaches at one end to shaft 107 forming a hinge and to second plate 102 and at the opposite end. Shaft 107 is turned at a first end 108 of the shaft 107, thus raising the first plate 101 of the traction jack. Plates 101, 102 can extend to any angle between 0 degrees and 90 degrees to create an appropriate ramp to help move a stuck vehicle tire.

Removable center jack mechanism 103 can include extendable at least one locking arm that swing down from plate 101 to plate 102 to add support to the first plate 101 and second plate 102 when the traction jack is in an opened position. The locking arm (not illustrated) can be appropriately shaped, such as rectangular, to withstand the force of a vehicle's tire resting atop an extended plate 101. The locking arm, or a plurality of locking arms, swing down from plate 101 to lock in notches or gutter 110 in plate 102.

The removable center jack mechanism 103 attaches to first plate 101 and second plate 102 via pins 104a, 104b, 105a, 105b, 106a, 106b. Pins 104a, 104b, 105a, 105b, 106a, 106b can comprise ball spring pins or locking pins, for example. There are six holes on the traction jack (i.e., two holes in first plate 101 and four holes in second plate 102) where pins 104a, 104b, 105a, 105b, 106a, 106b are inserted to keep the removable center jack mechanism 103 in place. With these six pins 104a, 104b, 105a, 105b, 106a, 106b, it takes only thirty seconds to break the traction jack down or set it up. For example, a first location of the removable center jack mechanism 103 attaches to first plate 101 via pins 104a, 104b (illustrated in FIG. 2). A second location, or shaft 108, of the removable center jack mechanism 103 attaches to second plate 102 via pins 105a, 105b (illustrated in FIG. 2). A third location of the removable center jack mechanism 103 attaches to second plate 102 via pins 106a, 106b. Pins 104a, 104b, 105a, 105b, 106a, 106b require minimal effort to remove, thus making it easy to reconfigure the traction jack between a high-centered vehicle recovery or a standard flat surface vehicle recovery.

A second end 109 shaft 108 of the removable center jack mechanism 103 preferably comprises high strength acme all thread steel to prevent bending when lowering a vehicle. Each pin takes minimal effort to remove, making it easy to switch between a high-centered vehicle recovery or a standard flat surface vehicle recovery.

The first plate 101 and second plate 102 can be constructed of metal such as, for example, steel or aluminum, but is not limited solely to these types of materials. The vehicle traction jack is appropriately sized to receive and lift any size vehicle tire. For example, an exemplary first plate 101 and an exemplary second plate 102 of the vehicle traction jack can measure approximately ten to twelve inches wide and approximately twenty-four inches. The vehicle traction jack can be sized to receive larger, after-market tires, with an exemplary first plate 101 and an exemplary second plate 102 measuring approximately twelve inches wide by sixteen inches to twenty-four inches long. It is understood that all dimensions of the first plate 101 and the second plate 102 are provided for illustrative purposes only and do not limit the disclosed embodiments to those particular dimensions. A vehicle can be driven up onto the partially-opened vehicle traction jack when the center jack mechanism 103 is used to create a ramp. The height of the ramp is controlled by the user extending the center jack mechanism 103. The appropriately-sized first plate 101 and second plate 102 supports the vehicle for repairs underneath the vehicle and/or to the vehicle's tire.

Figure 2:
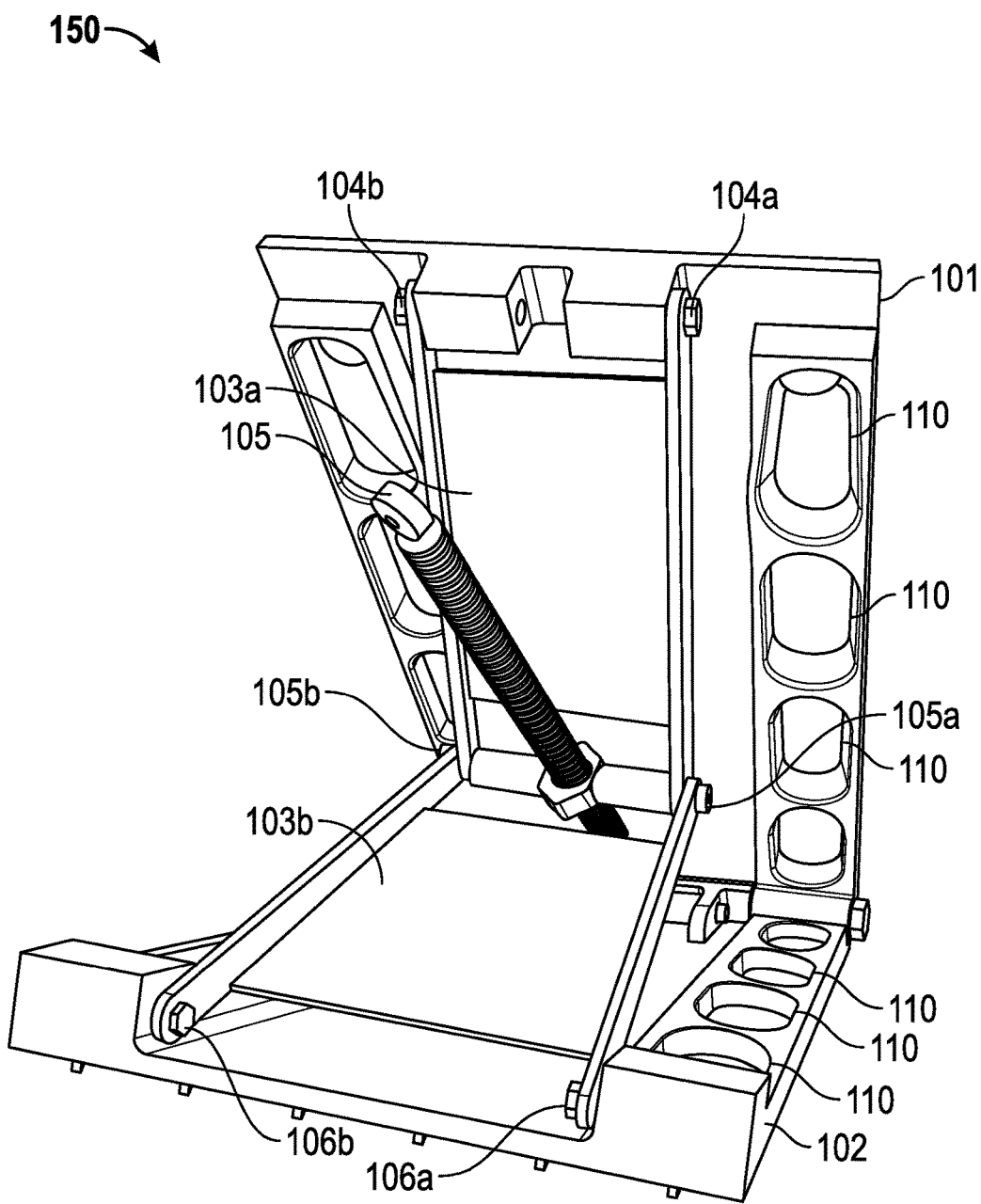
FIG. 2 illustrates an exemplary perspective view of the traction jack in a partially opened position, in accordance with an embodiment.

FIG. 2 illustrates an exemplary perspective view 150 of the traction jack in a partially opened position, in accordance with an embodiment. The first plate 101 is extended to a 45 degree angle using center jack mechanism 103. The first plate 101 is lowered towards the second plate 102 by turning shaft 107. Undersides of first plate 101 and second plate 102 are sized to receive removable center jack mechanism 103 when plates 101, 102 are parallel to each other. The undersides of first plate 101 and second plate 102 are designed with incorporated gutters 110 to reduce the weight of traction jack. Gutters 110 offer a way for the device to become anchored on the ground or in the environment it is being used, thus preventing slipping and shooting out from under the tire.

FIG. 3 illustrates an exemplary perspective view 200 of the traction jack in a partially opened position, in accordance with an embodiment. First plate 101 has three holes 111a, 111b, 111c, which accommodate mounting brackets so users have an option to store the traction jack on a vehicle's roof or outside the vehicle. On the surface of the two plates, there are exemplary 240-270 strategically-placed spikes 112 that help the tire gain traction. These spikes 112 work anywhere from icy conditions to caked-on mud. Both first plate 101 and second plate 102 are covered in exemplary ¾ inch dull spikes 112 to provide traction between plates 101, 102 and the surface. The spikes 112 are dulled to prevent damaging tires when the tires contact spikes 112 on first plate 101.

Hinge 113 between first plate 101 and second plate 102 allows the traction jack to be folded, opened, closed, or opened flat. In an alternate embodiment, the hinge assembly 113 does not open past 180 degrees, thus forming a flat bridge with added traction for a vehicle's tire. The hinge assembly 113 provides the first plate 101 and the second plate 102 with a full rotational range of motion and articulated adjustability for positioning the traction jack between a tire and a surface. The hinge assembly allows the first plate 101 and second plate 102 to open to a partially opened position (e.g., less than 180°) and a fully opened position (e.g., greater than or equal to 180°). The hinge assembly 113 allows the traction jack to be folded into a closed position, or to one half of its fully opened length, for easy transport and storage. The hinge assembly's 113 folding feature allows plates 101, 102 to conform to terrain when recovering a vehicle.

Figure 4:
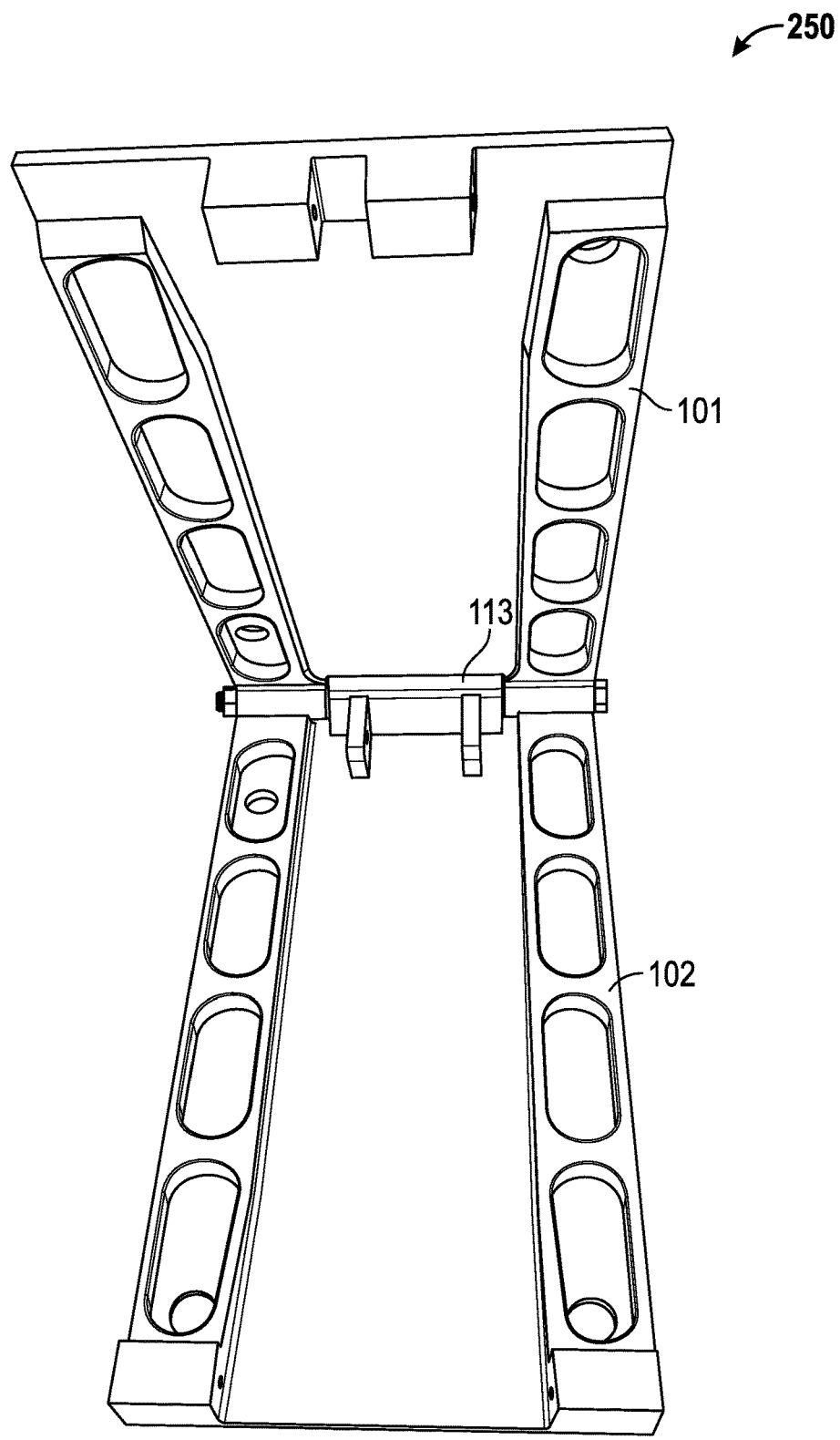
FIG. 4 illustrates an exemplary perspective view of the traction jack in a partially opened position with a center jack mechanism removed, in accordance with an embodiment.

FIG. 4 illustrates an exemplary perspective view 250 of the traction jack in a partially opened position with center jack mechanism 103 removed, in accordance with an embodiment. First plate 101 and second plate 102 remain attached at hinge assembly 113 when center jack mechanism 103 is removed. First plate 101 and second plate 102 can extend to a flat, 180 degree bridge when center jack mechanism 103 is removed. The fully opened vehicle traction jack can be used as a traction mat platform to provide additional traction for a vehicle's tire. When in the fully-opened position, the spikes 112 on the first plate 101 and second plate 102 extend upward.

Figure 5:
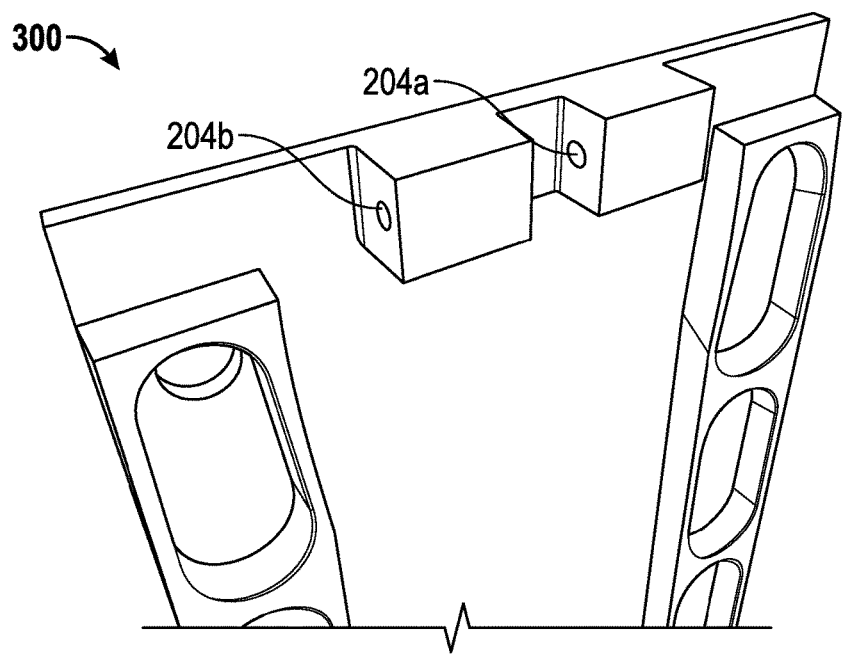
FIG. 5 illustrates an exemplary perspective view of the traction jack with pin attachments for attaching center jack mechanism, in accordance with an embodiment.

FIG. 5 illustrates an exemplary perspective view 300 of the traction, jack with pin attachments 204a, 204b for attaching center jack mechanism 103, in accordance with an embodiment. Pins 104a, 104b (not illustrated) fits into pin attachments 204a, 204b, respectively to hold a side of removable center jack mechanism in place between first plate 101 and second plate 102.

Figure 6:
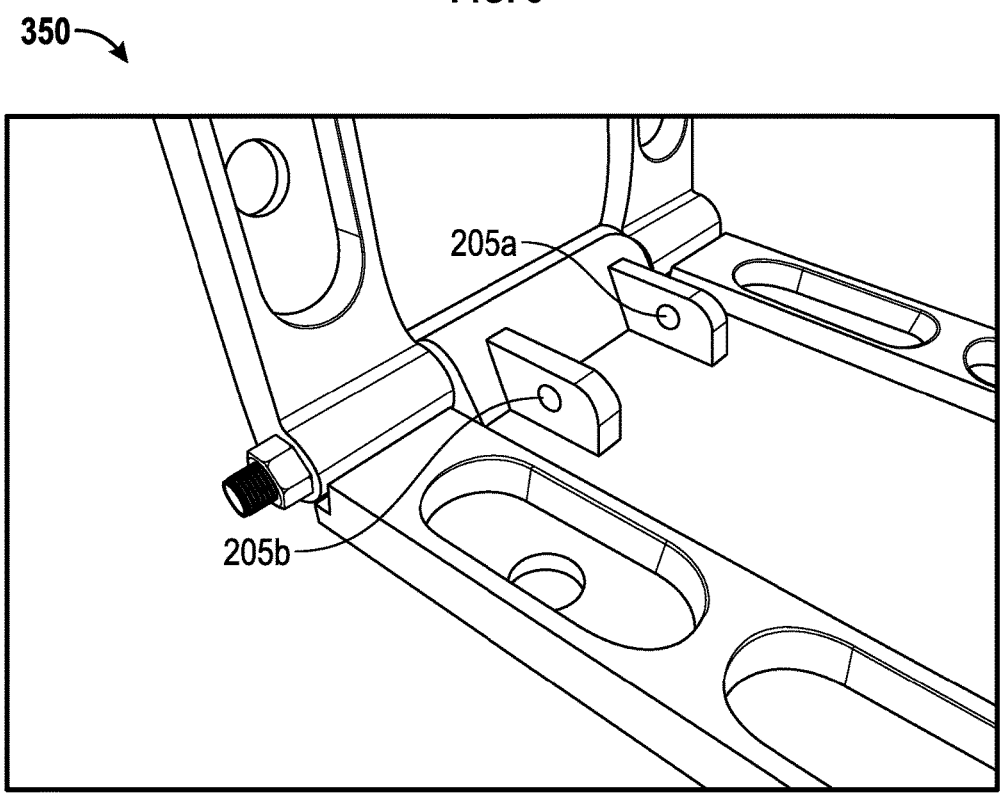
FIG. 6 illustrates an exemplary perspective view of the traction jack with pin attachments for attaching center jack mechanism, in accordance with an embodiment.

FIG. 6 illustrates an exemplary perspective view 350 of the traction jack with pin attachments 205a, 205b for attaching center jack mechanism, in accordance with an embodiment. Pins 105a, 105b (not illustrated) fits into pin attachments 205a, 205b, respectively to hold a side of removable center jack mechanism in place between first plate 101 and second plate 102.

Figure 7:
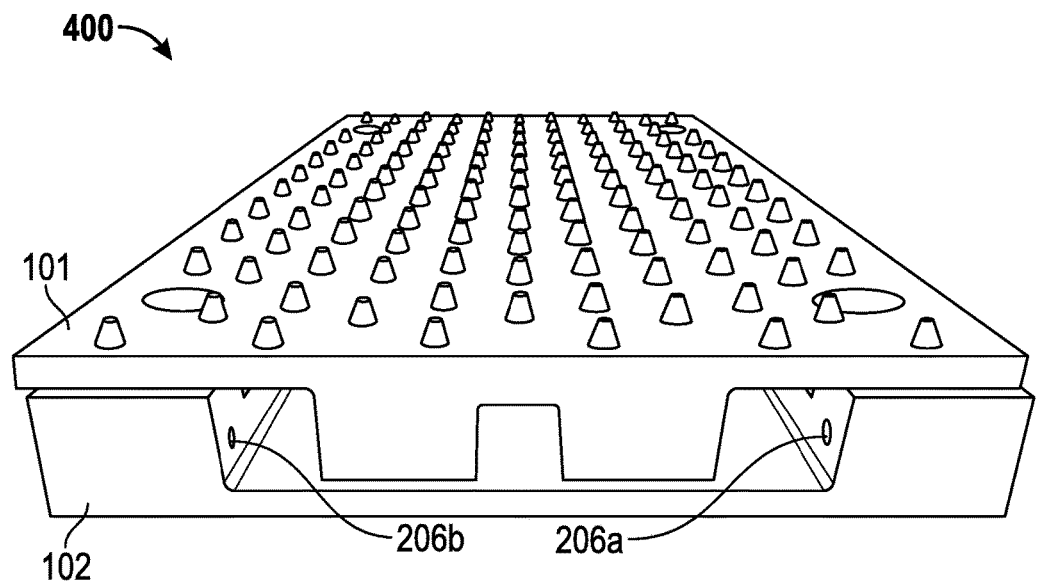
FIG. 7 illustrates an exemplary perspective view of the traction jack in a closed position, in accordance with an embodiment.

FIG. 7 illustrates an exemplary perspective view 400 of the traction jack in a closed position and pin attachments 206a, 206b for attaching center jack mechanism, in accordance with an embodiment. Pins 106a, 106b (not illustrated) fits into pin attachments 206a, 206b, respectively to hold a side of removable center jack mechanism in place between first plate 101 and second plate 102. First plate 101 has casted locking docks where removable center mechanism screws into first plate 101.

Figure 8:
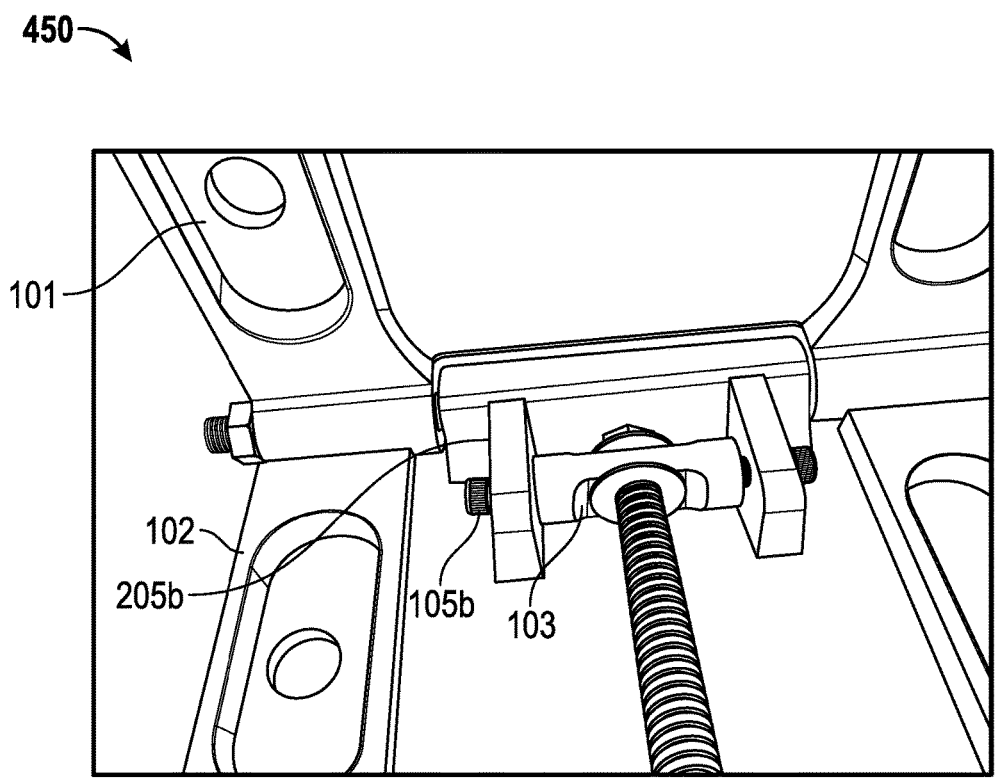
FIG. 8 illustrates an exemplary perspective view of the traction jack in a partially opened position with a pin attached at a second location of a center jack mechanism, in accordance with an embodiment.

FIG. 8 illustrates an exemplary perspective view 450 of a center jack mechanism 103 of the traction jack in a partially opened position with pin 105b attached at pin attachment 205b, in accordance with an embodiment.

Figure 9:
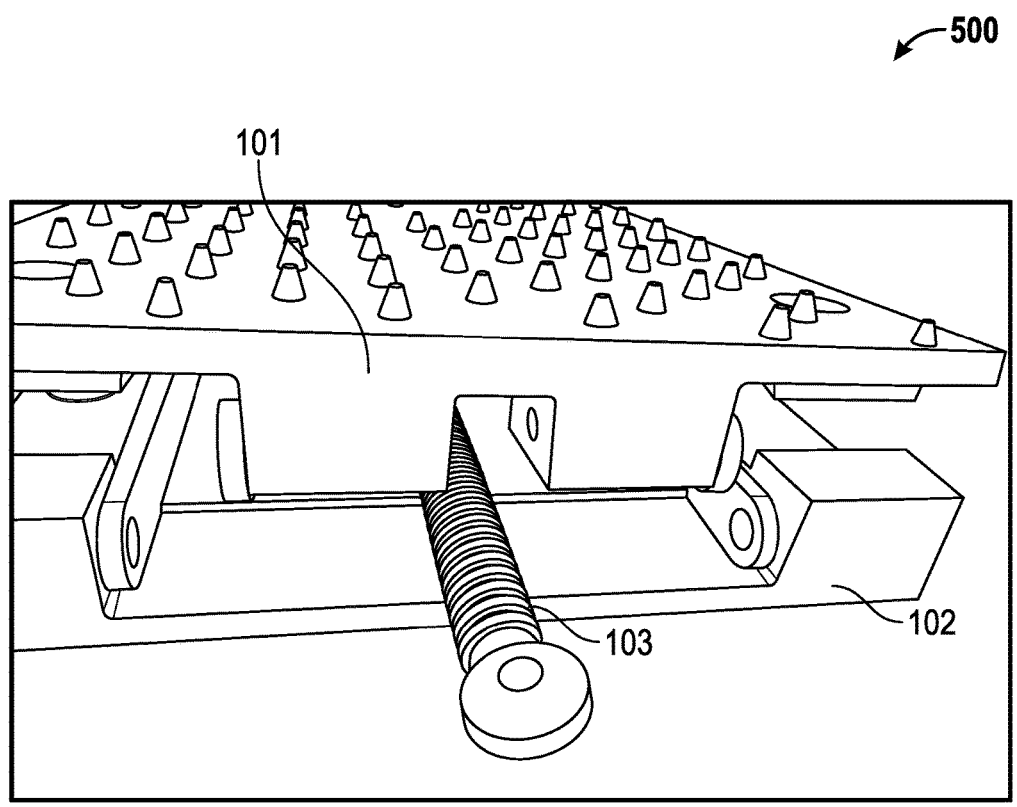
FIG. 9 illustrates an exemplary perspective view of the traction jack in a closed position with an attached center jack mechanism, in accordance with an embodiment.

FIG. 9 illustrates an exemplary perspective view 500 of the traction jack in a closed position with an attached center jack mechanism 103, in accordance with an embodiment. First plate 101 lies parallel to second plate 102 when the removable center jack mechanism is in place between plates 101, 102.

Figure 10:
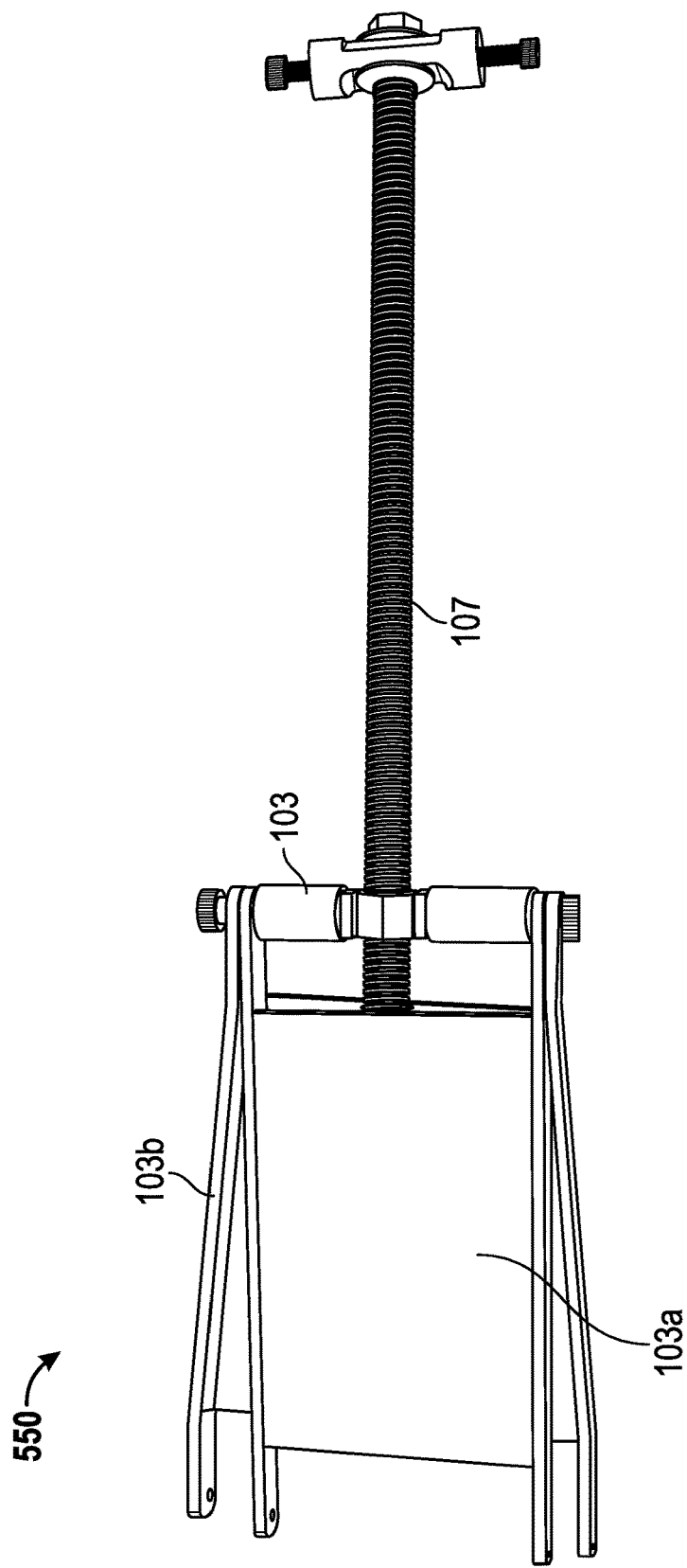
FIG. 10 illustrates an exemplary overhead view of the traction jack's center jack mechanism, in accordance with an embodiment.

FIG. 10 illustrates an exemplary overhead view 550 of the traction jack's center jack mechanism 103 with plates 103a, 103b and shaft 107, in accordance with an embodiment. Plate 103a attaches via pins 104a, 104b to first plate 101. Plate 103b attaches via pins 106a, 106b to second plate 102.

Based on the foregoing, it can be appreciated that a number of different embodiments, preferred and alternative, are disclosed herein. For example, in one embodiment, a traction jack apparatus is disclosed. The traction jack apparatus can comprise: a first plate, wherein the first plate comprises a rigid and rectangular surface capable of supporting the vehicle, wherein the first plate is permanently covered in an anti-slip, high traction surface with a high coefficient of friction for frictional engagement with the tire of the vehicle; a second plate attached to the first plate via a hinge assembly wherein the hinge assembly provides a rotational range of motion and articulated adjustability between the first plate and the second plate for positioning the traction jack between a tire of a vehicle and a surface; and a removable center jack mechanism attached to the first plate and the second plate for extending an angle between the first plate and the second plate from a closed position to a partially-opened position or a fully-opened position to provide a ramp to assist the tire of the vehicle when the tire of the vehicle is stuck on the surface.

In other embodiments, the surface comprises a rut, hole, roadway condition, or weather condition. In another embodiment, the anti-slip, high traction surface comprises a plurality of dulled spikes extending from the first plate and the second plate. In yet other embodiments, the second plate comprises a rigid and rectangular surface capable of supporting the vehicle, wherein the second plate is covered in an anti-slip, high traction surface with a high coefficient of friction for frictional engagement with the tire of the vehicle. In still other embodiments, the first plate and the second plate comprise steel or aluminum. In other embodiments, the partially-opened position of the first plate and the second plate forms an angle less than 180° or equal to 180°.

In another embodiment, the removable center jack mechanism comprises a first lifting plate and a second plate to that support the vehicle weighing up to 3000 pounds, wherein the first lifting plate attaches at one end to the first plate and at an opposite end to a shaft of the removable center jack mechanism to thus form a hinge, wherein the second lifting plate attaches at one end to the shaft of the removable center jack mechanism and to the second plate at an opposite end, and wherein the removable center jack mechanism comprises at least one extendable locking arm that swings down to add support to the first plate and the second plate when the first plate and the second plate are supporting a tire of the vehicle.

In yet other embodiments, the apparatus further comprises a shaft of the removable center jack mechanism, wherein the shaft is turned at, a first end of the shaft, thus raising the first plate to an angle forming a ramped surface. In another embodiment, the removable center jack mechanism attaches to the first plate and the second plate via at least one pin, wherein the at least one pin comprises at least one of a ball spring pin and a locking pin, wherein the at least one pin is inserted into a pin attachment to support the removable center jack mechanism between the first plate and the second plate. In other embodiments a first location of the removable center jack mechanism attaches to the first plate via a first plurality of pins, wherein a second location of the removable center jack mechanism attaches to the second plate via a second plurality of pins, and wherein a third location of the removable center jack mechanism attaches to the second plate via a third plurality of pins. In yet another embodiment, the apparatus comprises at least one gutter on an underside of the first plate and at least one gutter on an underside of the second plate to reduce the weight of the first plate and the second plate, and anchor the second plate to a ground surface.

In another embodiment, a traction jack apparatus comprising: a first plate, wherein the first plate comprises a rigid and rectangular surface capable of supporting the vehicle, wherein the first plate is permanently covered in an anti-slip, high traction surface with a high coefficient of friction for frictional engagement with the tire of the vehicle; a second plate attached to the first plate via a hinge assembly wherein the hinge assembly provides a rotational range of motion and articulated adjustability between the first plate and the second plate for positioning the traction jack between a tire of a vehicle and a surface, wherein the second plate comprises a rigid and rectangular surface capable of supporting the vehicle, wherein the second plate is covered in an anti-slip, high traction surface with a high coefficient of friction for frictional engagement with the tire of the vehicle; and a removable center jack mechanism attached to the first plate and the second plate for extending an angle between the first plate and the second plate from a closed position to a partially-opened position or a fully-opened position to provide a ramp to assist the tire of the vehicle when the tire of the vehicle is stuck on the surface, wherein the removable center jack mechanism comprises a first lifting plate and a second plate to support the vehicle weighing up to 3000 pounds, wherein the first lifting plate attaches at one end to the first plate and at an opposite end to a shaft of the removable center jack mechanism to thus form a hinge, wherein the second lifting plate attaches at one end to the shaft of the removable center jack mechanism and to the second plate at an opposite end, and wherein the removable center jack mechanism comprises at least one extendable locking arm that swings down to add support to the first plate and the second plate when the first plate and the second plate are supporting a tire of the vehicle.

In yet other embodiments, the anti-slip, high traction surface comprises a plurality of dulled spikes extending from the first plate and the second plate. In an embodiment, the partially-opened position of the first plate and the second plate forms an angle less than 180° or equal to 180°. In other embodiments, the apparatus further comprises a shaft of the removable center jack mechanism, wherein the shaft is turned at a first end of the shaft, thus raising the first plate to an angle forming a ramped surface. In another embodiment, the removable center jack mechanism attaches to the first plate and the second plate via at least one pin, wherein the at least one pin comprises at least one of a ball spring pin and a locking pin, wherein the at least one pin is inserted into a pin attachment to support the removable center jack mechanism between the first plate and the second plate, wherein a first location of the removable center jack mechanism attaches to the first plate via a first plurality of pins, wherein a second location of the removable center jack mechanism attaches to the second plate via a second plurality of pins, and wherein a third location of the removable center jack mechanism attaches to the second plate via a third plurality of pins. In an embodiment, the apparatus further comprises at least one gutter on an underside of the first plate and at least one gutter on an underside of the second plate to reduce the weight of the first plate and the second plate, and anchor the second plate to a ground surface.

Another embodiment discloses a method for assisting a vehicle. The method comprises: providing a traction jack device comprising a first plate covered in a high-traction material, a second plate covered in a high-traction material, a hinge assembly associated with the first plate and the second plate, wherein the hinge assembly provides a rotational range of motion and articulated adjustability between the first plate and the second plate for positioning the traction jack device between a tire of the vehicle and a surface, and a removable center jack mechanism associated with the first plate and the second plate; and extending the removable center jack mechanism attached to the first plate and the second plate to form an angled vehicle ramp to provide a high-traction, ramped surface to assist a tire of the vehicle.

In an embodiment, the method comprises extending the removable center jack mechanism from a closed position to a partially opened position comprising an angle less than 180° between the first plate and the second plate, or a fully-opened position comprising an angle equal to 180° between the first plate and the second plate. In another embodiment, the method further comprises attaching the removable center jack mechanism to the first plate and the second plate via at least one pin, wherein the at least one pin comprises at least one of a ball spring pin and a locking pin, wherein the at least one pin is inserted into a pin attachment to support the removable center jack mechanism between the first plate and the second plate, wherein a first location of the removable center jack mechanism attaches to the first plate via a first plurality of pins, wherein a second location of the removable center jack mechanism attaches to the second plate via a second plurality of pins, and wherein a third location of the removable center jack mechanism attaches to the second plate via a third plurality of pins.

It will be appreciated that variations of the above-disclosed and other features and functions, or alternatives thereof, may be desirably combined into many other different systems or applications. Furthermore, various presently unforeseen or unanticipated alternatives, modifications, variations or improvements therein may be subsequently made by those skilled in the art, which are also intended to be encompassed by the following claims.

The invention claimed is:

1. A traction mat for extricating a vehicle from inferior road conditions including ice, snow, mud, gravel, sand, and loose dirt where vehicle tire traction is affected, comprising:
 a first plate, wherein said first plate comprises a rigid and rectangular upper surface capable of supporting said vehicle and an under surface adapted to make contact with a ground, wherein said first plate is permanently covered in an anti-slip, high traction surface with a high coefficient of friction for frictional engagement with said tire of said vehicle, wherein the anti-slip, high traction surface further comprises a plurality of dulled spikes extending from said first plate;
 a second plate attached to said first plate via a hinge assembly wherein said hinge assembly provides a rotational range of motion and articulated adjustability between said first plate and said second plate to conform to a surface where vehicle tire traction is affected by ice, snow, gravel, mud, sand, or loose dirt, and wherein said second plate also comprises a rigid and rectangular upper surface capable of supporting said vehicle and an under surface adapted to make contact with the ground, wherein the upper surface is also covered with a plurality of dulled spikes extending from said second plate and creating an anti-slip, high traction surface;
 cleats formed on the undersides of the first and second plates; and
 at least one gutter formed in an underside of said first plate and at least one gutter formed in the underside of said second plate to reduce the weight of said first plate and said second plates, and to further anchor said first and second plate to a soft ground surface;
 wherein at least one of said first plate and said second plate have holes formed therein to accommodate mounting brackets there through to securing the apparatus to a vehicle.

2. The apparatus of claim 1, wherein said hinge assembly enables said first plate and said second plate to be opened fully and conform to terrain surfaces during vehicle recovery.

* * * * *